United States Patent

[11] 3,622,541

| [72] | Inventors | Gerhard Darsow<br>Krefeld-Uerdingen;<br>Ludwig Bottenbruch, Krefeld-Bockum;<br>Hermann Schnell, Krefeld-Uerdingen, all of Germany |
|---|---|---|
| [21] | Appl. No. | 823,493 |
| [22] | Filed | May 9, 1969 |
| [45] | Patented | Nov. 23, 1971 |
| [73] | Assignee | Farbenfabriken Bayer Aktiengesellschaft<br>Leverkusen, Germany |
| [32] | Priority | June 7, 1968 |
| [33] | | Germany |
| [31] | | P 17 70 593.0 |
| | | The portion of the term of the patent subsequent to Nov. 6, 1970, has been disclaimed. |

[54] HALOGEN-CONTAINING, HIGH-MOLECULAR, SOLUBLE, THERMOPLASTIC POLYARYL POLYETHERS
9 Claims, No Drawings

[52] U.S. Cl. .................................................. 260/61,
260/47 R, 260/49, 260/DIG. 24
[51] Int. Cl. .......................................................... C08g 23/00
[50] Field of Search .................................................. 260/49, 47, 61

[56] References Cited
UNITED STATES PATENTS

| 3,257,357 | 6/1966 | Stamatoff | 260/47 |
|---|---|---|---|
| 3,257,358 | 6/1966 | Stamatoff | 260/47 |
| 3,306,875 | 2/1967 | Hay | 260/47 |
| 3,332,909 | 7/1967 | Farnham et al. | 260/47 |

FOREIGN PATENTS

| 1,407,301 | 6/1965 | France | |

*Primary Examiner*—Melvin Goldstein
*Assistant Examiner*—Melvin Goldstein
*Attorney*—Connolly and Hutz ABSTRACT: The invention relates to new halogen-containing, high-molecular, soluble, thermoplastic polyaryl polyethers of the formula (I)

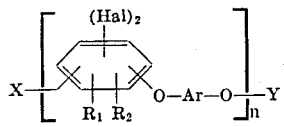

in which $R_1$ and $R_2$ denote hydrogen or identical or different alkyl or alkoxy radicals with one to four carbon atoms; Hal is fluorine, chlorine or bromine; Ar is an unsubstituted or substituted phenylene, naphthylene, diphenylene or polynuclear bivalent aromatic radical of the formula (II)

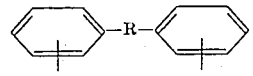

where R denotes a bivalent aliphatic, cycloaliphatic or araliphatic radical with one to eight carbon atoms or —O—, —S—, —SO—, —SO$_2$—or —CO—, X denotes a halogen atom or the radical
—O—Ar—OH,
Y denotes a hydrogen atom or the radical

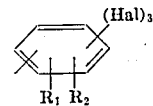

and $n$ denotes an integer from about 3 to about 200. These new polyethers are produced by reacting molar amounts of a tetrahalobenzene or of several tetrahalobenzenes of the formula (III)

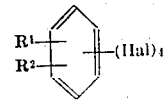

and of a bisphenolate or of several bisphenolates of the formula (IV)
Me—O—Ar—O—Me
in which Me denotes an alkali metal, in a polar organic solvent at temperatures between about 80° C. and about 180° C.

HALOGEN-CONTAINING, HIGH-MOLECULAR, SOLUBLE, THERMOPLASTIC POLYARYL POLYETHERS

The object of the invention comprises halogen-containing, high-molecular, soluble, thermoplastic polyaryl polyethers of the formula (I)

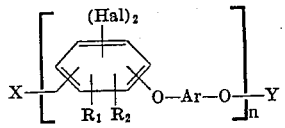

in which $R_1$ and $R_2$ denote hydrogen or identical or different alkyl or alkoxy radicals with one to four carbon atoms; Hal is fluorine, chlorine or bromine; Ar is an unsubstituted or substituted phenylene, naphthylene, diphenylene or polynuclear bivalent aromatic radical of the formula (II)

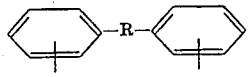

where R denotes a bivalent aliphatic, cycloaliphatic or araliphatic radical with one to eight carbon atoms or —O—, —S—, —SO—, —SO$_2$— or —CO—, the substituents of the aromatic nuclei being alkyl or alkoxy radicals having one to four carbon atoms or halogen, X denotes a halogen atom or the radical —O—Ar—OH, Y denotes a hydrogen atom or the radical

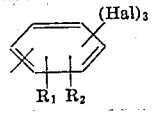

and n denotes an integer from about 3 to about 200.

The melting range of these new polyethers is generally comprised between about 100° and about 250° C. The products are practically colorless and are soluble, for example, in methylene chloride, dimethyl sulfoxide and dimethylformamide. They have a good stability to oxidation and to acidic and alkaline hydrolysis as well as good mechanical properties and a good retention of shape over a wide range of temperature. Their good noninflammability is worth emphasizing. They can be used to advantage as resins, varnishes, films, fibers and as mouldings produced according to the injection moulding, extrusion and compression moulding processes wherever noninflammability, advantageous mechanical properties and thermal stability are of importance, for example in the textile industry and in electroengineering, in rail and motor vehicle construction as well as in shipbuilding and aircraft construction.

The new polyethers can be prepared according to the invention by reacting molar amounts of a tetrahalobenzene or of several tetrahalobenzenes of the formula (III)

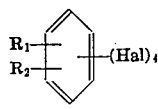

and of a bisphenolate or of several bisphenolates of the formula (IV)

Me—O—Ar—O—Me in which Me denotes an alkali metal, in a polar organic solvent at temperatures of between about 80° and about 180° C., preferably about 120° C. and about 160° C.

Only two halogen atoms of the tetrahalobenzene react during this operation, whereas the remaining two halogen atoms remain attached to the benzene nucleus. If the tetrahalobenzene contains different halogen atoms, these react in the order fluorine, chlorine, bromine.

Examples of tetrahalobenzenes are: 1,2,4,5-tetrachlorobenzene, 1,2,3,5-tetrachlorobenzene, 1,2,3,4-tetrachlorobenzene, 1,2,4,5-tetrachloro-3,6-dimethyl-benzene, 1,2,4,5-tetrafluorobenzene, 1,2,4,5-tetrabromobenzene; furthermore, tetrahalobenzenes with different halogen atoms, e.g., 1,3-difluoro-4,6-dichlorobenzene, 1,4,-dibromo-2,5-dichlorobenzene, 1,4-difluoro-2,5-dibromobenzene.

Examples of diphenols are mononuclear diphenols, such as hydroquinone and resorcinol; binuclear diphenols, such as dihydroxy-diphenyls; but preferably bisphenols of the formula (V)

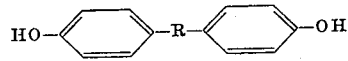

in which R denotes a bivalent aliphatic, cycloaliphatic or araliphatic radical with one to eight carbon atoms or —O—, —S—, —SO—, —SO$_2$— or —CO—.

Examples of compounds of this type are: bis-(4-hydroxyphenyl)-methane, 1,1-bis-(4-hydroxyphenyl)-cyclohexane, bis-(4-hydroxyphenyl)-phenylmethane, 4,4'-dihydroxydiphenyl ether, sulfide, sulfoxide, sulphone, 4,4'-dihydroxybenzophenone, but particularly 2,2-bis-(4-hydroxyphenyl)-propane.

The aromatic nuclei may contain additional substituents, besides the hydroxyl groups, for example, methyl, ethyl, propyl, isopropylbutyl and isobutyl groups such as in 2,2-bis-(3-methyl-4-hydroxyphenyl)-propane, or halogen, with the proviso that spatially large substituents in a position adjacent to the hydroxyl groups do not impair the reactivity of the latter by steric or any other hindrance.

Suitable cations for the bisphenolates are those of the metals of the first main group of the Periodic System, but the sodium and potassium phenolates are preferred.

Examples of suitable polar organic solvents are diethyl sulfoxide, dimethyl-sulphone, diethyl-sulphone, diisopropyl-sulphone and tetramethyl-sulphone, but preferably dimethyl sulfoxide.

To carry out the process, equimolar amounts of tetrahalobenzene and dialkali metal phenolate are introduced into one of the aforesaid solvents and reacted at about 80° to about 180° C., preferably at about 120° to about 160° C., without the use of a special catalyst, to form the high-molecular polyaryl polyether with the elimination of equimolar amounts of alkali metal halide.

To obviate oxidative reactions, the reaction is expediently carried out in an inert gas atmosphere, for example, under nitrogen. If polyethers of a high molecular weight are desired, the water content of the reaction mixture must be below 0.5 percent by weight.

Some alkali metal salts of bisphenols can be freed from the adherent water only with difficulty and it is therefore frequently troublesome to bring the water content of the reaction mixture to below 0.5 percent by weight according to the method of operation described above; the dialkali metal phenolates are therefore preferably prepared in situ by dissolving the bisphenol in a sufficient amount of the polar solvent to be used for the subsequent reaction in an apparatus which is continuously rinsed with nitrogen, adding the stoichiometric amount of alkali metal hydroxide in solid form or as an aqueous solution, heating the mixture at about 120° to about 160° C. for some time, e.g., 4 to 8 hours, and thus distilling off the water contained in the mixture. In order to achieve a more rapid and complete removal of the water, it is expedient to add an additional solvent, for example, benzene, toluene or chlorobenzene, and to distill off the water from the mixture azeotropically with the additional solvent, optionally under reduced pressure.

To the cooled dehydrated solution of the phenolate in the polar solvent there is then added the stoichiometric amount of tetrahalobenzene, expediently dissolved in the same solvent. The condensation is then carried out by heating this mixture, for example for 6 to 8 hours, at temperatures of about 80° C. to about 180° C., preferably at about 120° C. to about 160° C. The alkali metal halide formed in the course of the condensation separates as an insoluble salt and can be removed in a simple manner by filtering off from the hot solution. After cooling, the latter is mixed with water or with a lower alcohol such as methanol or ethanol. The polyaryl polyether is thus quantitatively precipitated in solid form. It is separated and thoroughly washed with water in order to remove residues of salt and solvent.

EXAMPLE 1

114.1 g. (0.5 mol) 2,2-bis-(4-hydroxyphenyl)-propane are placed in a metal vessel of 1 litre capacity and dissolved in 600 ml. dimethyl sulfoxide. The vessel is fitted with a gas feed tube, stirrer, thermometer, reflux condenser and a water receiver filled with toluene. A slow current of nitrogen is then passed through the apparatus in order to generate an inert gas atmosphere. 40.0 g. (1 mol) sodium hydroxide in solid form or as a concentrated aqueous solution and 150 ml. toluene are added. The reaction mixture so obtained is heated at 140°–150° C. for 6 to 8 hours, while the water contained in the reaction mixture and the water resultant from the phenolate formation is continuously distilled off azeotropically with toluene into the water receiver where it separates whereas the toluene flows back into the reaction mixture. When the water is completely removed from the reaction mixture, the water receiver is emptied, the toluene is distilled off, the mixture is allowed to cool, and 108.0 g. (0.5 mol) 1,2,4,5-tetrachlorobenzene and 150 ml. of anhydrous toluene are added. The mixture is then heated at 90°–100° C. for 1 hour while stirring. It is then slowly further heated to 140°–150° C. The reaction mixture is kept at this temperature for 6 hours whereupon the sodium chloride formed during the condensation rapidly separates. Towards the end of the reaction, the toluene present in the reaction mixture is distilled off and after cooling, the remaining mixture is slowly poured into 5 litres of rapidly stirred water. The reaction product is thus precipitated in solid form. It is filtered off with suction and thoroughly washed with water to remove residues of salt and solvent. The polyether obtained is a white to yellow-white powder which is readily soluble in solvents such as methylene chloride, chloroform, chlorobenzene, dimethyl-sulphone and dimethyl sulfoxide. The average molecular weight, obtained from scattered light measurings of a methylene chloride solution, is about 22,000–24,000. The melting range is between 140° and 180° C. The chlorine content amounts to 18.7 percent by weight. The product is barely inflammable.

EXAMPLE 2

114.1 g. (0.5 mol) 2,2-bis-(4-hydroxyphenyl)-propane are dissolved in 600 ml. dimethyl sulfoxide in an apparatus according to example 1, which is additionally fitted with a heatable dropping funnel. A slow nitrogen current is then passed through the apparatus, and an amount of 40 g. (1 mol) sodium hydroxide is added in solid form or as a concentrated aqueous solution. The mixture is heated with stirring until a clear solution is obtained, and 250 ml. chlorobenzene are then added. The resultant mixture is heated at reflux temperature until water no longer separates in the water receiver and a pure chlorobenzene cycle is obtained. The chlorobenzene is then distilled off, and a solution of 108.0 (0.5 mol) 1,2,4,5-tetrachlorobenzene in 200 ml. of anhydrous chlorobenzene, which has been heated to 60° C., is added through the dropping funnel. The reaction mixture is slowly heated to reflux temperature (about 160° C.) and kept at this temperature for 1 or more hours, depending on the desired degree of condensation.

To obtain the product, the cooled solution is added dropwise to a four- to five-fold excess of alcohol, after filtering off the separated sodium chloride. The precipitated product is filtered off with suction, washed with alcohol and subsequently dried. However, it is also possible to proceed as in example 1 and to obtain the ether by distilling off the additional solvent, then precipitating the reaction product by the dropwise addition to an excess of water and working up as in example 1.

After condensation for 2 hours, the condensation product has an average molecular weight of 26,000–28,000. The chlorine content is about 18.9 percent by weight.

EXAMPLE 3

57.1 g. (0.25 mol) 2,2-bis-(4-hydroxyphenyl)-propane are dissolved in 500 ml. dimethyl sulfoxide in an apparatus according to example 1, which is additionally fitted with a heatable dropping funnel. A slow nitrogen current is passed through the apparatus, and an amount of 28.1 g. (0.5 mol) potassium hydroxide is added in solid form or as a concentrated aqueous solution. The mixture is heated with stirring until a clear solution is obtained, and 250 ml. chlorobenzene are then added. The mixture is heated at boiling temperature until water no longer separates in the water receiver and a pure chlorobenzene cycle is obtained. The chlorobenzene is distilled off, and a solution of 98.4 g. (0.25 mol) 1,2,4,5-tetrabromobenzene in 250 ml. of anhydrous chlorobenzene, which has been heated to 70° C., is added through the dropping funnel. The reaction mixture is slowly heated to reflux temperature and is kept at this temperature for 1 or more hours, depending on the desired degree of condensation.

To obtain the polymer, the chlorobenzene is distilled off and the remaining solution is added dropwise to a four-fold excess of water. The precipitated product is filtered off with suction and washed with water to remove residues of salt and solvent.

After condensation for 4 hours, the product has an average molecular weight of 21,000 and a bromine content of 33.4 percent by weight. It is a yellow-white powder which is readily soluble in the solvents mentioned in example 1. The melting range is between 120° and 160° C. The product is hardly inflammable.

EXAMPLE 4

93.1 g. (0.5 mol) 4,4'-dihydroxydiphenyl are dissolved in 800 ml. dimethyl sulfoxide in an apparatus according to example 1, which is additionally fitted with a heatable dropping funnel. A slow nitrogen current is then passed through the apparatus, and an amount of 40 g. (1 mol) sodium hydroxide is added in solid form or as a concentrated aqueous solution. The mixture is heated with stirring until a clear solution is obtained, and 250 ml. chlorobenzene are then added. The mixture is heated at reflux temperature until water no longer separates in the water receiver and a pure chlorobenzene cycle is obtained. The chlorobenzene is then distilled off, and a solution of 108.0 g. (0.5 ml.) 1,2,4,5-tetrachlorobenzene in 200 ml. of anhydrous chlorobenzene, which has been heated to 60°–70° C., is added through the dropping funnel. The reaction mixture is slowly heated to reflux temperature (about 160° C.) and kept at this temperature for 1 or more hours, depending on the desired degree of condensation.

To obtain the product, the cooled solution is added dropwise to a four- to six-fold excess of methanol, after filtering off the separated sodium chloride. The precipitated product is filtered off with suction, washed with alcohol and subsequently dried in a vacuum. The polyether can also be obtained as in example 1 by distilling off the additional solvent, then precipitating the reaction product by the dropwise addition to an excess of water, and working up.

After condensation for 4 hours, the product has an average molecular weight of about 12,000. It is a yellow-white powder which is readily soluble in the solvents mentioned in example 1. The melting range is between 160° and 220° C. The product is hardly inflammable.

We claim:
1. A polyaryl polyether of the formula

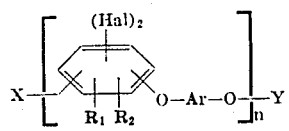

wherein $R_1$ and $R_2$ are hydrogen or alkyl or alkoxy having from one to four carbon atoms; Hal is fluorine, chlorine or bromine; Ar is phenylene, naphthylene, diphenylene,

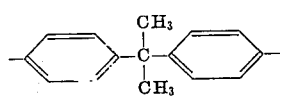

or a radical of the formula

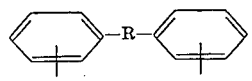

wherein R is a bivalent aliphatic, cycloaliphatic or araliphatic radical having one to eight carbon atoms, —O—, —S—, —SO—, —SO$_2$— or —CO—; X is halogen or —O—Ar—OH wherein Ar is as aforesaid; Y is hydrogen or

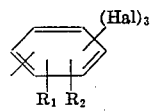

and n is an integer from about 3 to about 200.

2. The polyaryl polyether of claim 1 wherein Ar is

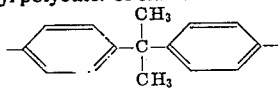

3. The polyaryl polyether of claim 1 wherein Ar is

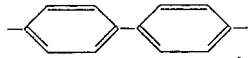

4. A process for producing the polyaryl polyether of claim 1 which consists essentially of reacting molar amounts of one or several tetrahalobenzenes of the formula

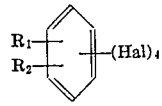

and of one or several bisphenolates of the formula

Me—O—Ar—O—Me wherein Me is an alkali metal, in a polar organic solvent selected from the group consisting of dimethylsulphoxide, diethylsulphoxide, dimethyl-sulphone, diethyl-sulphone, diisopropyl-sulphone and tetramethyl-sulphone at a temperature of about 80° to about 180° C.

5. The process of claim 4 wherein the temperature is from about 120° to about 160° C.

6. The process of claim 4 wherein the tetrahalobenzene is 1,2,4,5-tetrachlorobenzene.

7. The process of claim 4 wherein the tetrahalobenzene is 1,2,4,5-tetrabromobenzene.

8. The process of claim 4 wherein Ar is

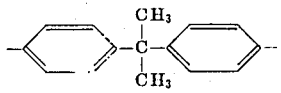

9. The process of claim 4 wherein Ar is

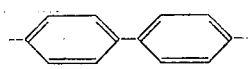

* * * * *